Nov. 17, 1964  N. H. VOGT ETAL  3,156,945
CARCASS BREAK-UP MEANS
Filed July 6, 1961  13 Sheets-Sheet 13

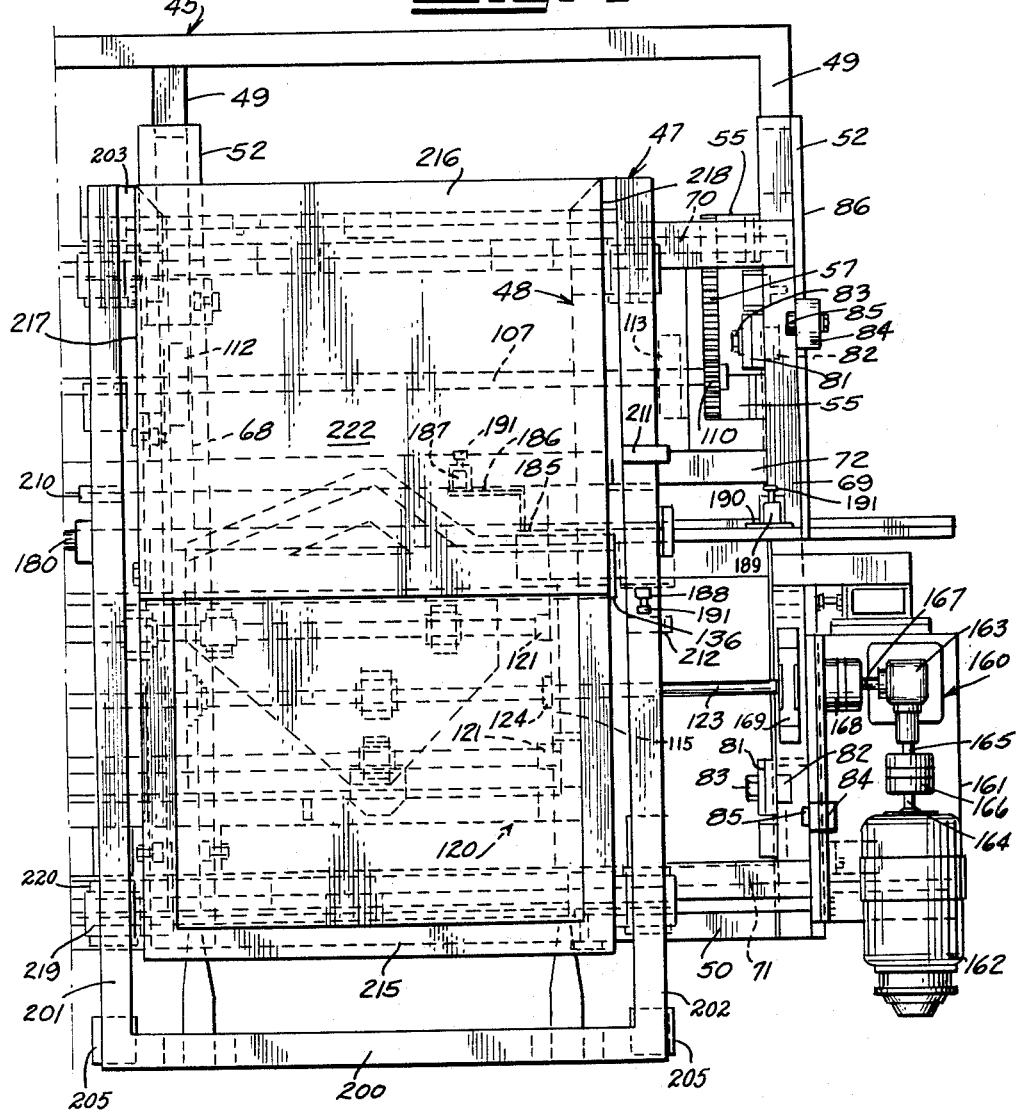

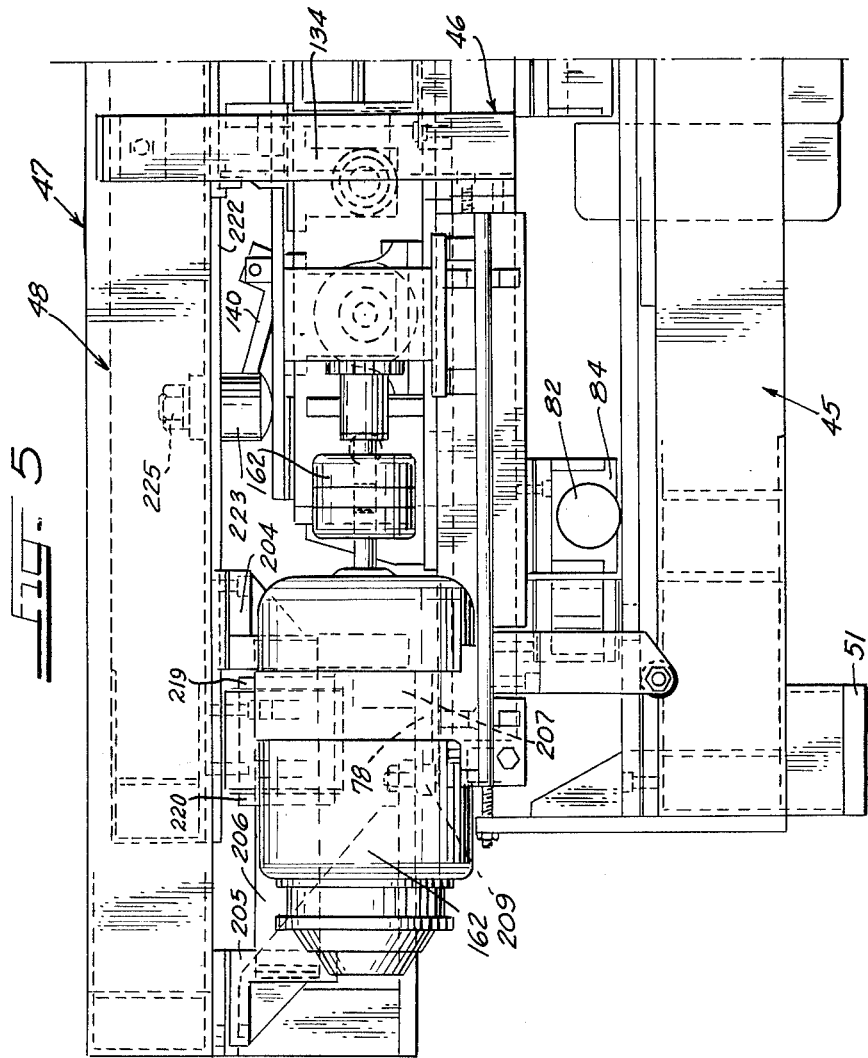

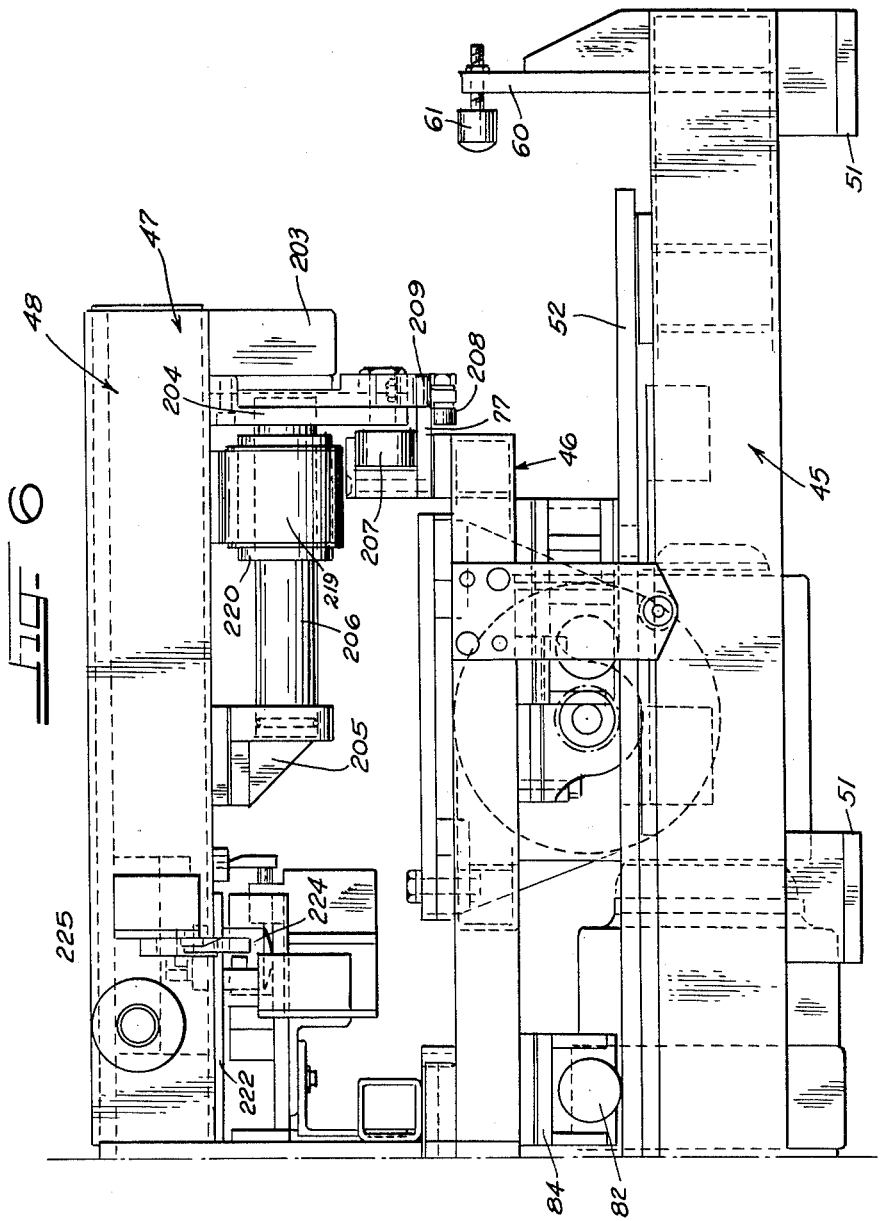

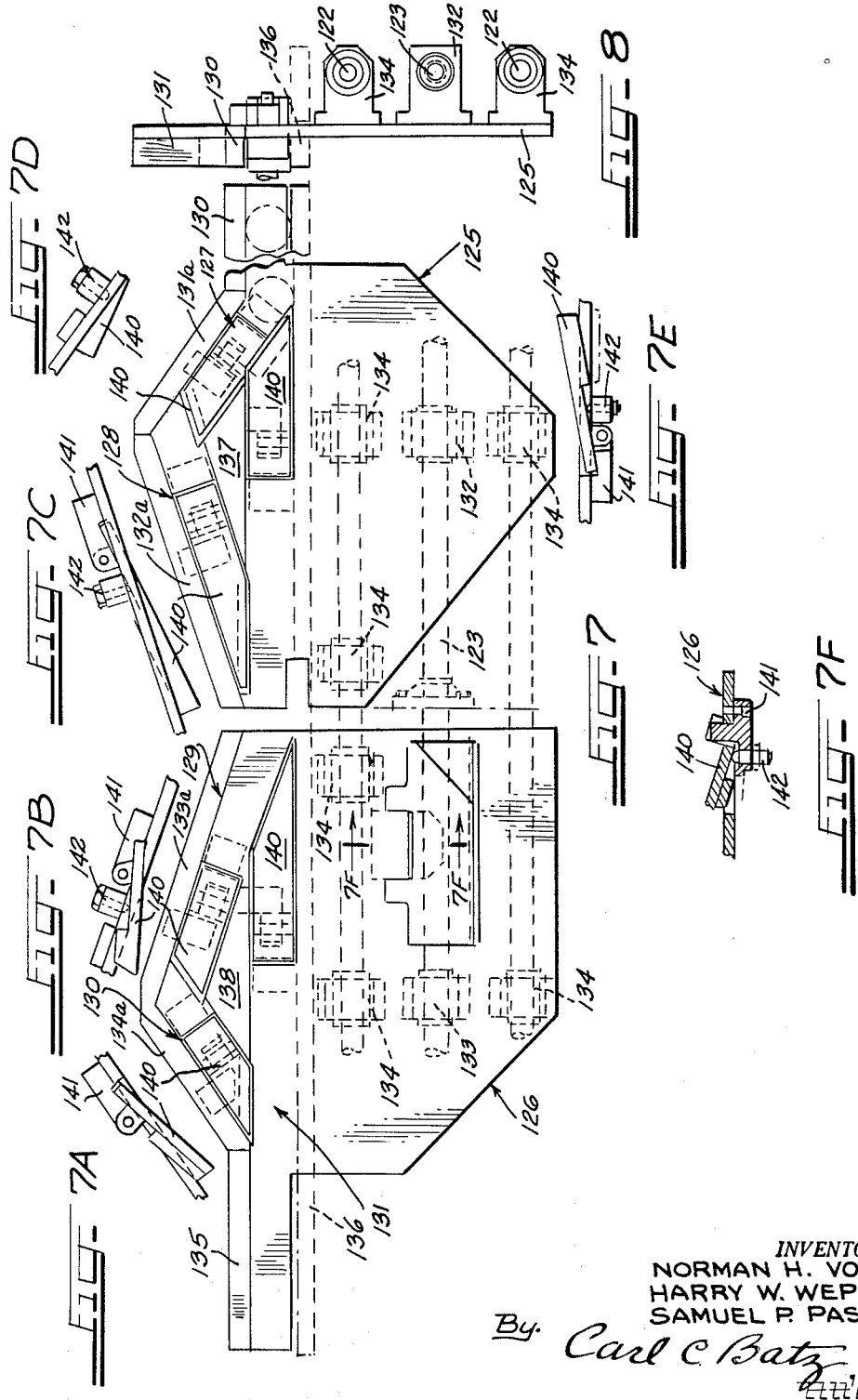

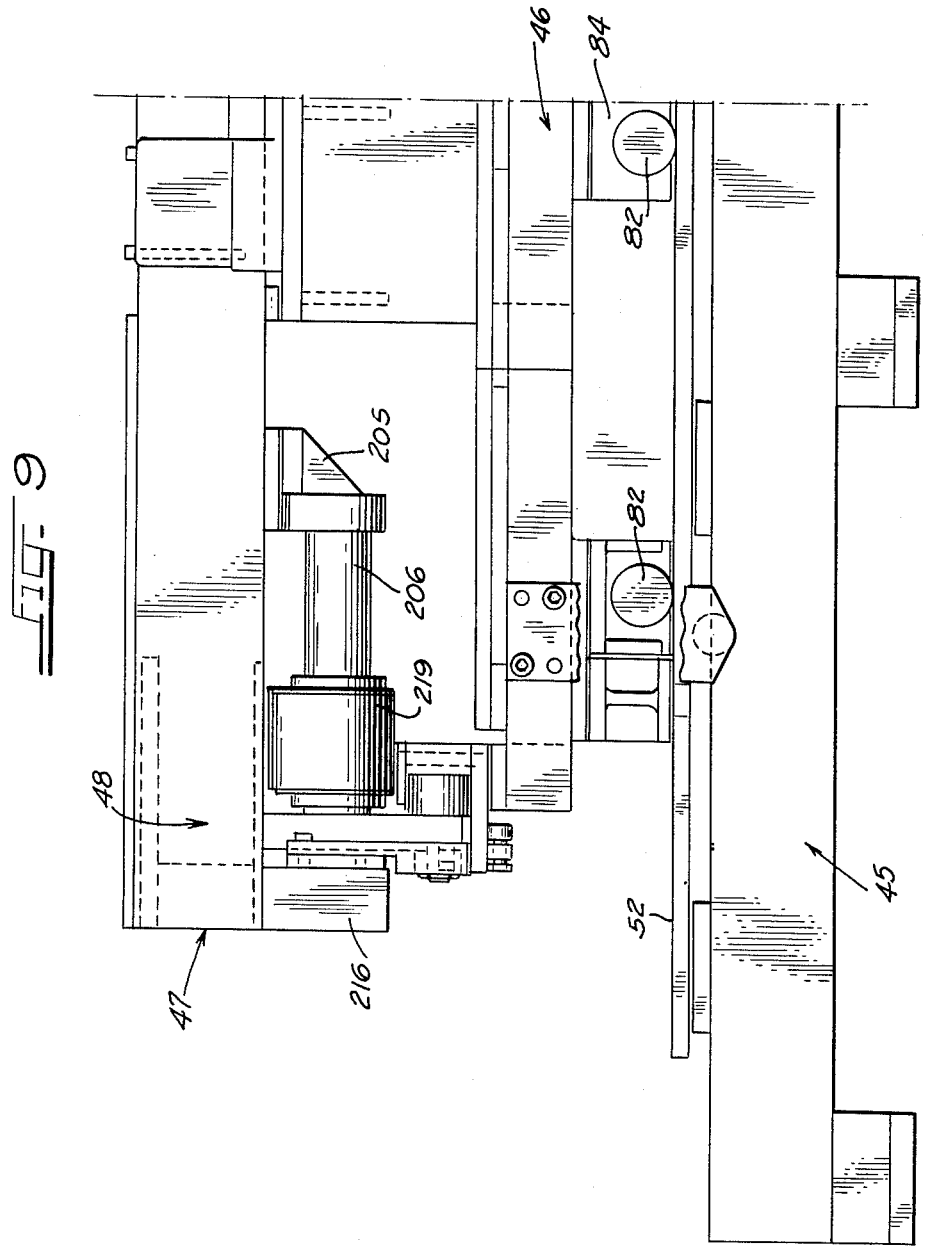

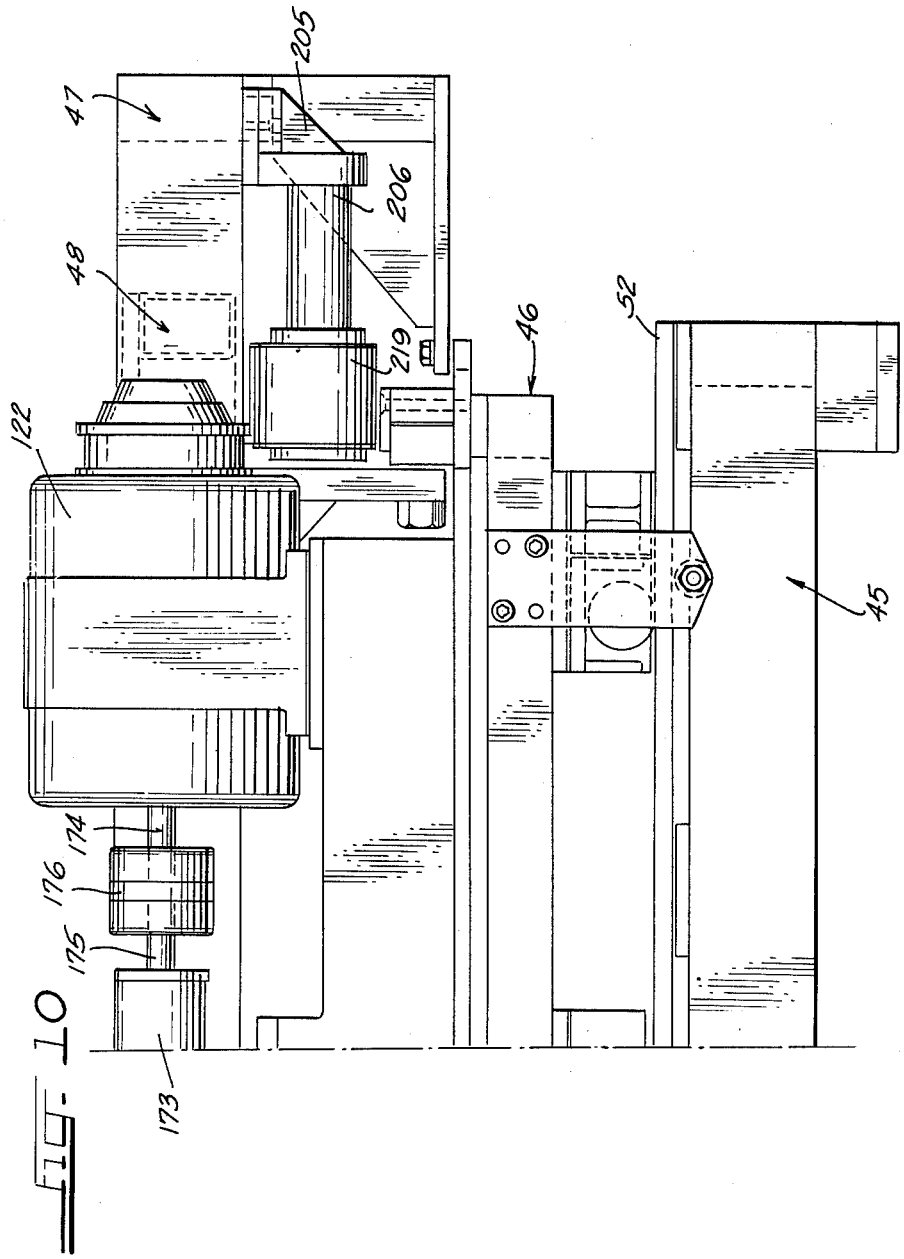

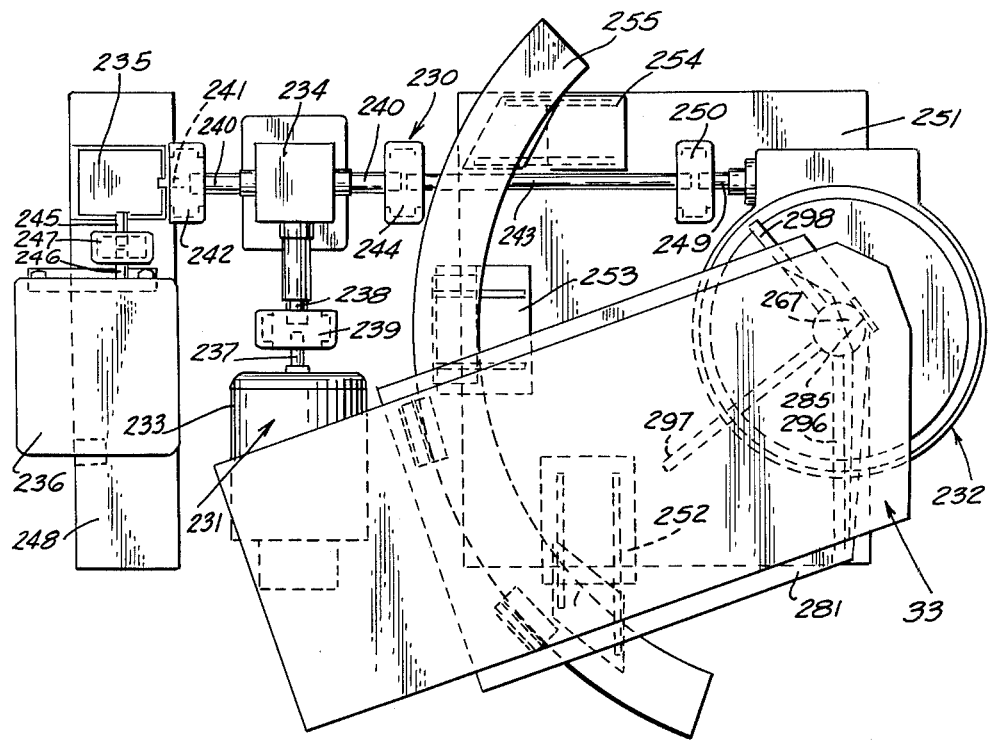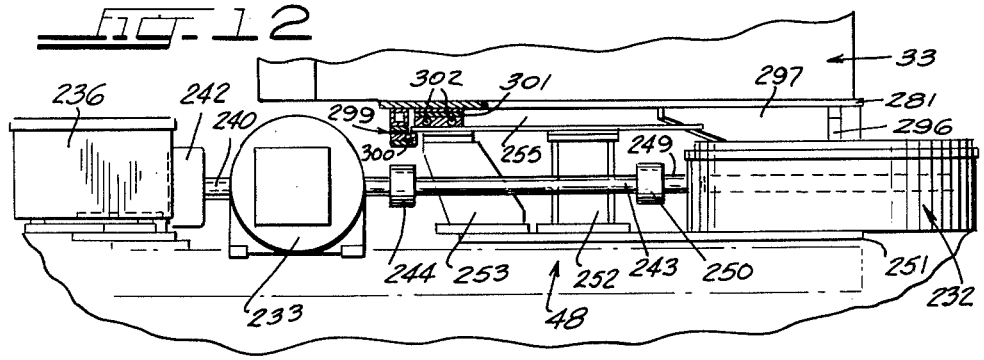

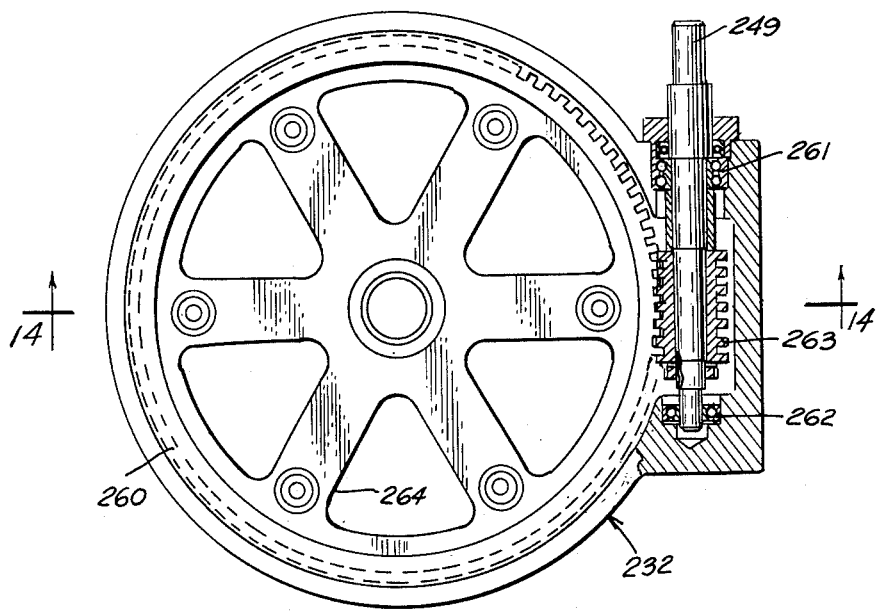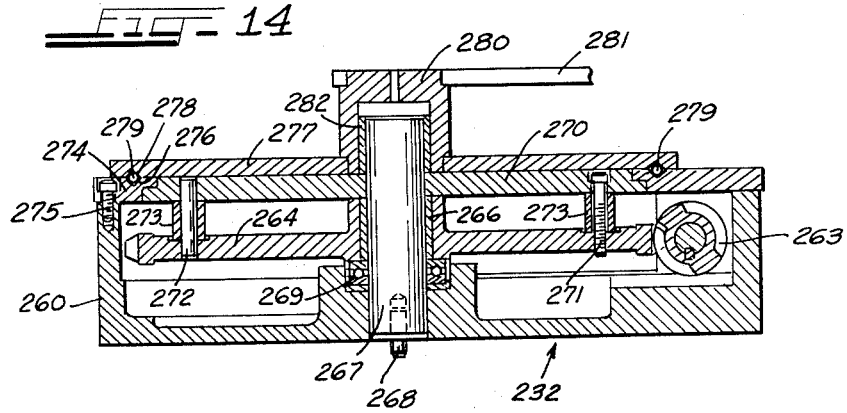

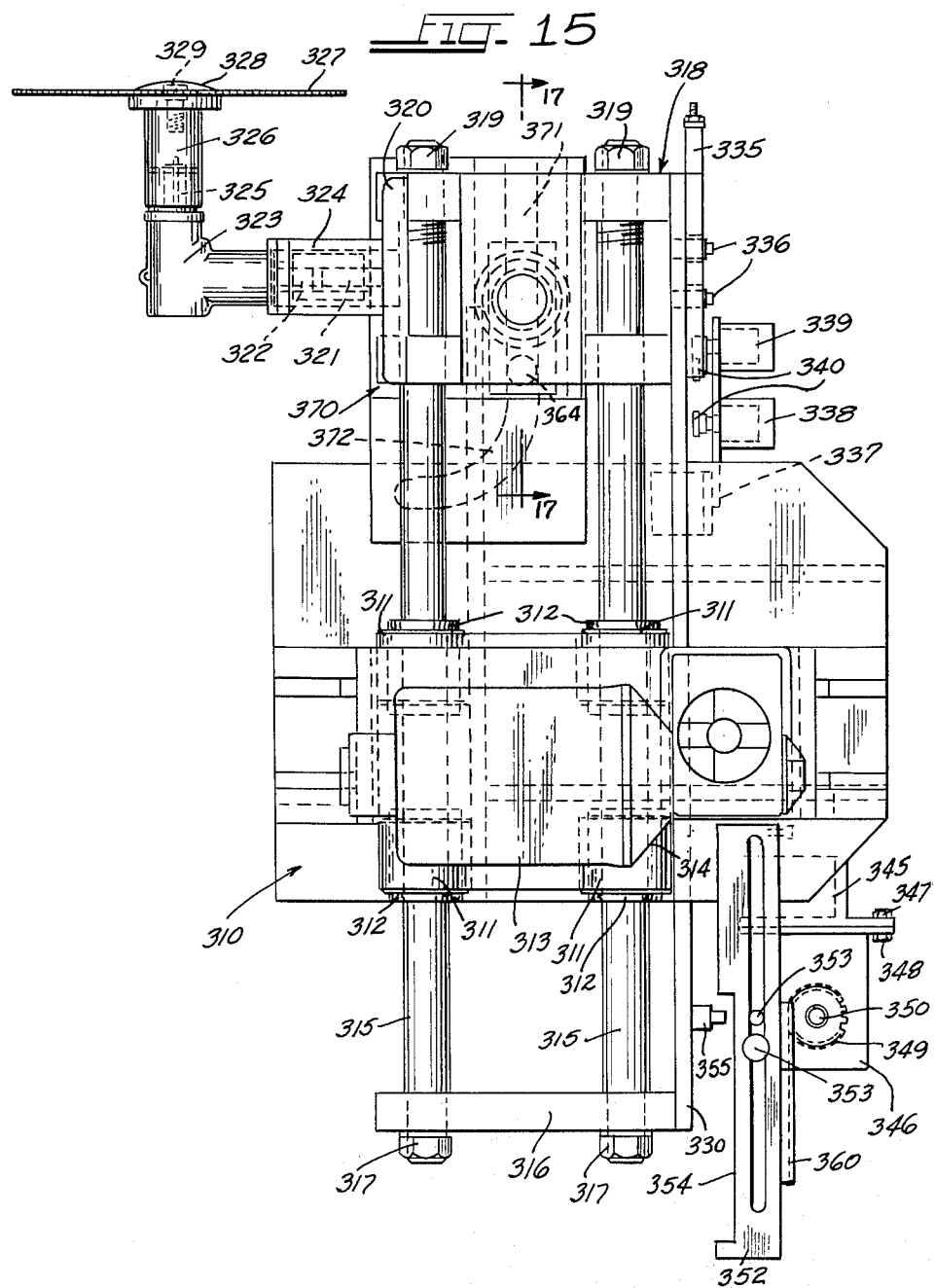

INVENTORS.
NORMAN H. VOGT
HARRY W. WEPRIN
SAMUEL P. PASUTIN
By Carl C. Batz

United States Patent Office 3,156,945
Patented Nov. 17, 1964

3,156,945
CARCASS BREAK-UP MEANS
Norman H. Vogt, Clawson, Mich., Harry W. Weprin, Chicago, Ill., and Samuel P. Pasutin, Royal Oak, Mich., assignors to Armour and Company, Chicago, Ill., a corporation of Delaware
Filed July 6, 1961, Ser. No. 122,321
10 Claims. (Cl. 17—1)

This invention relates to carcass break-up means, and is particularly useful in the treatment of hog carcasses and in the forming of ham sections. For the purpose of simplicity, the invention will be described herein in connection with the treatment of hog carcasses.

An object of the invention is to provide novel means for the break-up of animal carcasses. A further object is to provide means for treating hog carcasses for the forming of ham sections. Yet another object is to provide mechanism for continuously severing ham and foot portions of a hog carcass for rapid and accurate forming of the ham sections whereby there is a substantial saving of time and labor. A still further object is to provide a means whereby a carcass is held against sideways movement while cutting means are brought at a given position into engagement with the carcass, for cutting foot and ham portions, with the cutting action operating in the same direction, whereby highly accurate division is obtained. Yet another object is to provide a mechanism wherein cutting members and carcass holding members for supporting two carcass halves in side-by-side relation may be caused to move relatively to each other so that the cutting means traverses both carcass halves in a continuous manner and in a path adjusted for the size of the carcasses for accurate division of the carcass portions. Other specific objects and advantages will appear as the specification proceeds.

The invention is shown, in an illustrative embodiment, by the accompanying drawings, in which—

FIG. 4 is a top plan view of the second half of the ham cutting means control apparatus;

FIG. 5 is a side, elevation view of the rear half of the ham cutting means control apparatus;

FIG. 6 is a side, elevation view of the front half of the ham cutting means control apparatus;

FIG. 7 is a composite view of cam means for controlling the path of travel of the ham cutting means;

FIGS. 7A through 7E are side elevation views, orthographically projected from FIG. 7, of portions of the cam control means;

FIG. 7F is a sectional view taken along line 7F—7F of FIG. 7;

FIG. 8 is an end view of the cam means;

FIG. 9 is an enlarged, broken side elevation view of the front portion of the ham cutting means control apparatus;

FIG. 10 is an enlarged, broken side elevation view of the rear portion of the ham cutting means control apparatus;

FIG. 11 is a top plan view of the ham cutting means rotating mechanism;

FIG. 12 is a partially sectioned side, elevation view of the ham cutting means rotating mechanism;

FIG. 13 is a top, plan view, partially in section, of the worm and gear mechanism utilized in the rotating means;

FIG. 14 is a sectional view taken along line 14—14 of FIG. 13;

FIG. 15 is a top plan view of the foot cutting means;

For simplification, the present invention will be described in connection with the removal of ham and foot portions from both halves of a hog carcass, in one continuous operation. This ham and foot cut-off apparatus may be utilized in the carcass break-up apparatus described in our copending applications, Serial No. 77,121, filed December 20, 1960, and Serial No. 110,076, filed May 15, 1961. Although the present apparatus could be used as a unitary machine, for maximum efficiency, it is preferred that it be utilized with an automated system.

Figure 1:
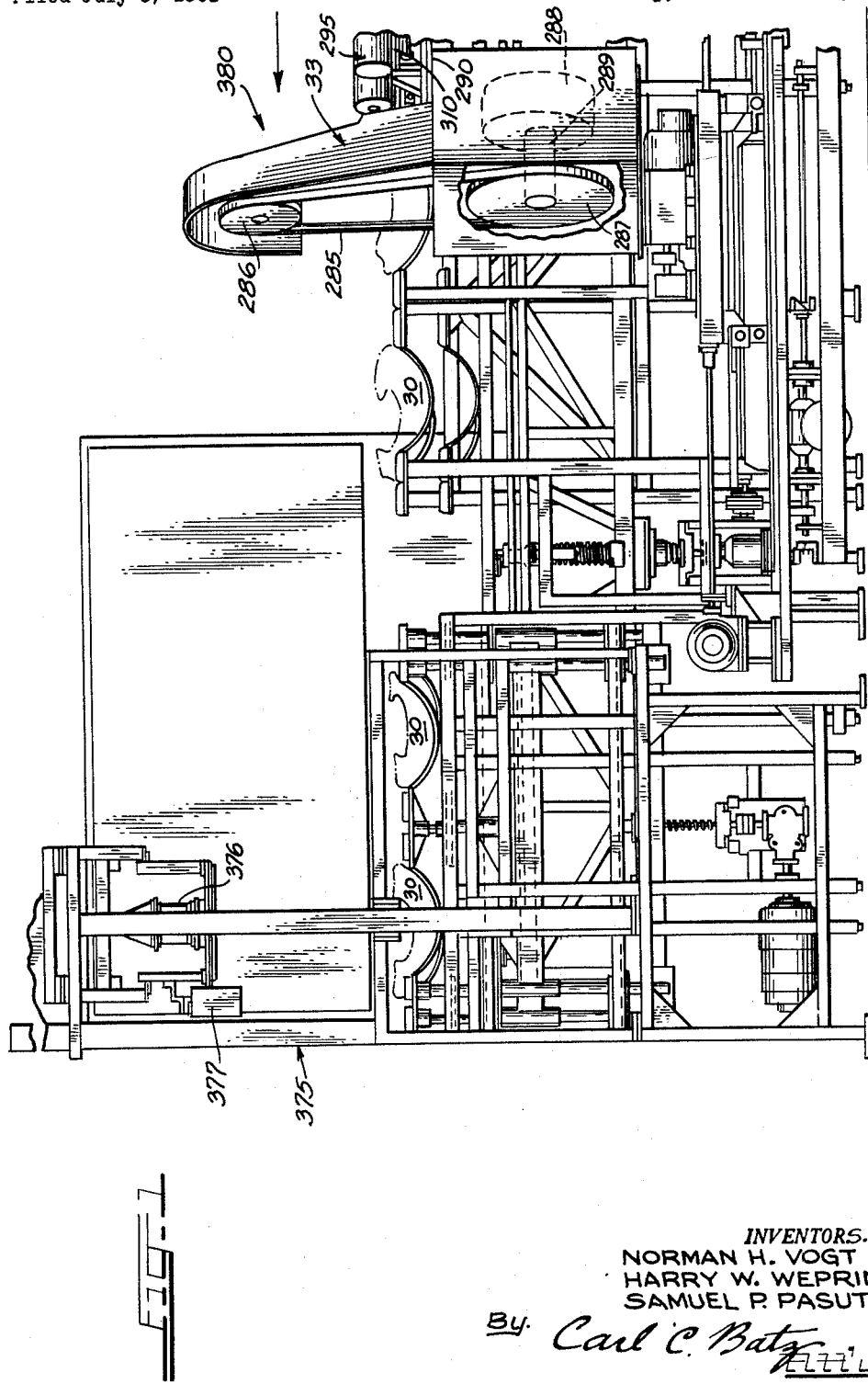
FIG. 1 is a broken, side elevation view of the ham and foot cut-off station and the control set up station.
Figure 2:
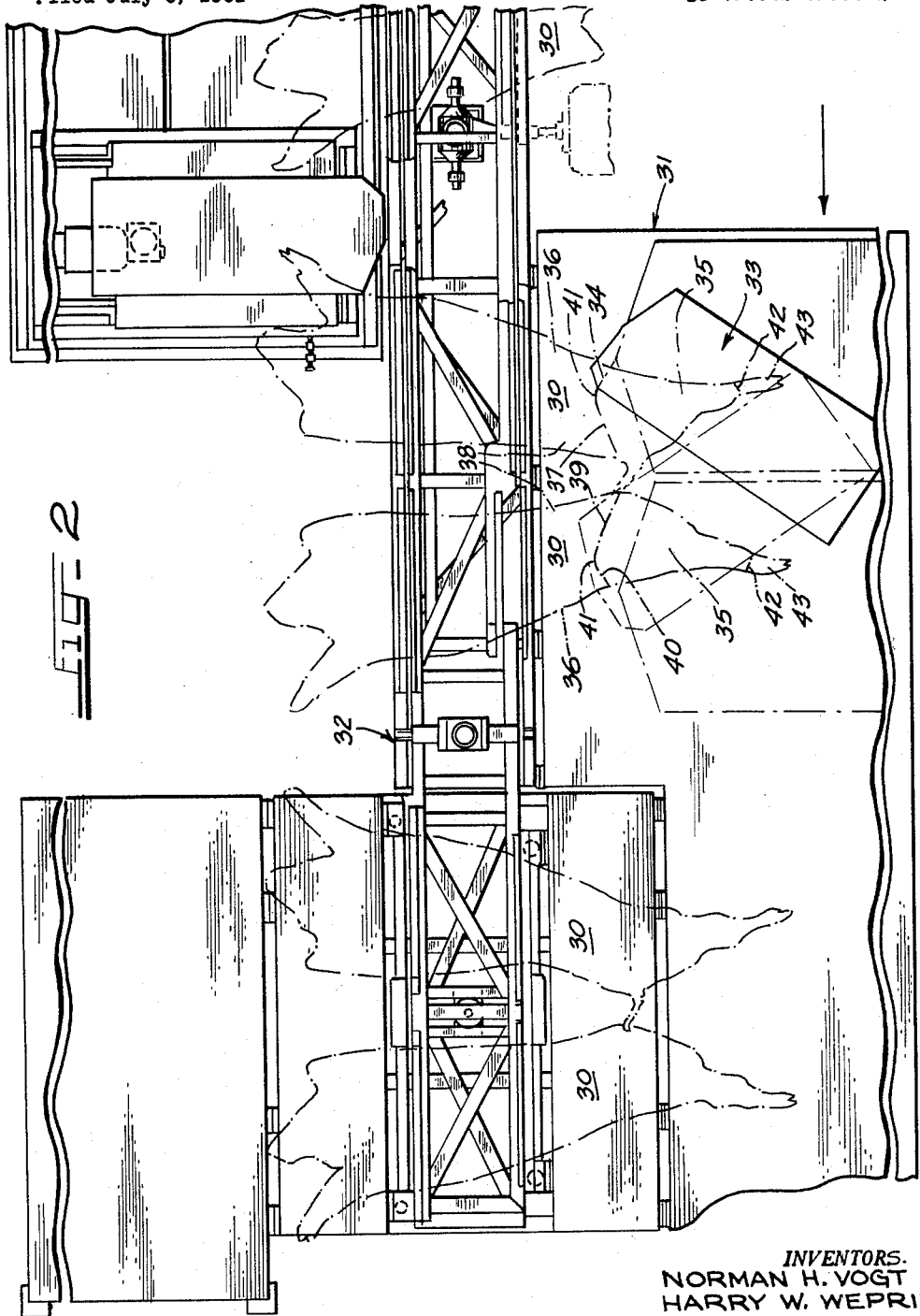
FIG. 2 is a broken, top plan view of the ham and foot cut-off station, the control set-up station, and a portion of the shoulder cut-off.

Referring to FIGS. 1 and 2, hog carcass halves 30 are at the ham and foot cut-off station, generally 31, on a transfer mechanism, generally 32. Any type of transfer mechanism may be used in connection with the ham and foot cutting operations although the automatic conveyor mechanism described in our co-pending application Serial No. 110,076, filed May 15, 1961, is preferred.

Hog carcasses 30 are ordinarily positioned skin-side down on the conveyor mechanism 32. The ham cutting means 33 may be moved in either direction, although in the present embodiment, movement is in the direction indicated by the arrows in FIGS. 1 and 2. The first cut 34 is a short cut between the ham portion 35 and the belly portion 36 of the animal 30. The second cut 37 is between the ham 35 and back portion 38 of the carcass 30. The third cut 39 is a long cut on the second half of the animal carcass 30 and is similar to the second cut 37. Each individual carcass 30 is cut in the general shape of an inverted V, or, in a continuous operation, the cuts on both halves are generally the shape of an M. At the junction or apex of cuts 34 and 37 and cuts 39 and 40, the saw 33 changes direction and an arcuate cut 41 is made on the hog carcass 30.

Foot cuts 42 are generally substantially parallel to long cuts 37 and 39 and are performed at approximately the same time. Foot cuts 42 separate hams 35 from hind feet 43.

Generally, in order to remove both ham portions 35 from hog carcasses 30 in a single continuous operation, in a substantially automatic system, the following movements may be used:

(1) Relative adjustment between the cutting means 33 and the carcass halves 30 to bring them into proper relative alignment, according to the particular length of carcass being processed;

(2) Relative adjustment between the cutting means 33 and the two carcass halves 30 in order to bring them into proper relative alignment, according to the distance between the carcass halves;

(3) Relative movement between cutting means 33 and carcass 30 in order to sever the hams 35 and feet 43 from the carcass 30;

(4) Guided movement to provide a generally M shaped cut through the carcass halves 30;

(5) Rotational movement to provide the arcuate cuts 41 in the carcass halves 30.

Preferred apparatus for removing both ham portions 35 and hind feet 43 from an animal carcass 30 will be described in detail.

Ham Removing Means

Referring to FIGS. 3, 4, 5 and 6, the ham cut-off mechanism is composed of four frames, including stationary frame 45, transversely moving frame 46, longitudinally moving frame 47, and reciprocating frame 48. These four frames or carriages together position the ham cut-off saw 33 relative to the hog carcass 30 and they also carry the saw 33 through the various cutting operations.

Stationary frame 45 includes longitudinal members 49 and transverse members 50. Spacers 51 are provided on the underside of transverse members 49 and 50 and are in contact with the ground. Rails 52 are on the upperside of transverse members 49. Corner braces 53 support corners of frame 45 by securing longitudinal members 49 to transverse members 50.

Secured to transverse supports 50 are gear rack supports 54 and 55, gear rack 56 being secured to supports 54 and gear rack 57 being secured to supports 55. Also, fastened to one transverse support 50 is arm 58 which carries rotary switch mounting plate 59. Bumper supports 60 are mounted to longitudinal members 49 and carry bumpers 61.

The second frame or first moving carriage 46 is adapted to move transversely to the hog carcass by rolling on tracks 52 of frame 45. Frame 46 comprises generally transverse members 65, 66, 67, 68 and 69 and longitudinal members 70 and 71. Intermediate to the transverse members 70 and 71 are longitudinal supports 72 and 73. Also, support 74 is positioned between longitudinal members 70 and 73. Further, extensions 75 and 76 are fastened to transverse member 65, and tie bar 77a extends between and is secured to extensions 75 and 76.

Secured to the upperside of longitudinal supports 70 and 71 are rails 77 and 78. Roller brackets 80 are fastened to transverse support 65 and roller brackets 81 are secured to transverse support 69. Rotatably supported rollers 82 roll on rails 52 of frame 45. Rollers 82 are secured to brackets 80 and 81 by nuts 83. Guide roller supports 84 are fastened to transverse members 65 and 69 and rotatably support rollers 85, which roll on the underside of rails 52. Other rollers (not shown) are adapted to ride along the outer edges 86 of rails 52.

Rotary switch mounting plate 90 is secured to tie bars 91 which extend between and are secured to supports 65 and 66. Rotary switch 92 is secured to the upperside of plate 90 and is provided with shaft 94 to which is secured gear 95. On the underside of tie bars 91 is mounted gear rack 96, which threadably engages gear 97 of rotary switch 98 (shown in hidden view), which is attached to the upperside of rotary switch mounting plate 59.

Longitudinal positioning means, generally 100, is secured to carriage 46 by attachment to the underside of plate 101. Positioning means 100 includes motor 102 (shown partially in hidden view) and gear unit 103 (shown in hidden view). Shaft 104 of gear unit 103 is attached to shaft 105 by coupling 106 and to shaft 107 by coupling 108. Gear 109 is secured to shaft 105 and engages gear rack 56 on frame 45, and gear 110 is secured to shaft 107 and engages gear rack 57. Shaft 105 is rotatably mounted in pillow block 111 which is mounted on support 74 of frame 46. Shaft 107 is rotatably mounted in pillow blocks 112 and 113, which are mounted on frame 46. When shaft 104 is rotated, gears 109 and 110 rotate and by engaging gear racks 56 and 57, cause relative motion between frame 45 and carriage 46. This movement adjusts for the particular length of carcass being processed.

Mounted on the upperside of transverse supports 66, 67 and 68 of frame 46 is cam plate mounting assembly generally 120. Guide rod supports 121 are on mounting 115 and provide support for guide rods 122. Lead screw 123 is rotatably mounted in bearings 124 on assembly 120.

Referring to FIGS. 7 and 8 in order to provide the M-shaped path of travel, cam plates 125 and 126 are provided. Cam tracts 127, 128, 129 and 130 are provided for the M ham cut and return track 131 is also provided on plates 125 and 126. Nut assembly 132 is on the underside of plate 125 and nut assembly 133 is on the underside of plate 126. Lead screw 123 threadably engages nuts 132 and 133, and is provided with left hand and right hand threads which correspond with the left hand and right hand threads of nuts 132 an 133. Since screw 123 and nuts 132 and 133 are provided with opposite threads, as screw 123 rotates, plates 125 and 126 move either away from or towards each other. Also, provided on the underside of plates 125 and 126 are bearings 134 which are slideably positioned on guide rods 122, providing sliding support for plates 125 and 126. Secured to the upperside of plate 125 are cam track sides 130, 131a and 132a, and secured to the upperside of plate 126 are cam track sides 133a, 134a and 135a. Return cam track guide 136 is secured to cam mounting 120 and thereby remains stationary as cam plates 125 and 126 move. Triangular cam track sides 137 and 138 are mounted on the upperside of plates 125 and 126. So, cam track sides 130 through 138 provide sides for cam tracks 127 through 131.

FIGS. 7A through 7E illustrate the rotatable members 140 of the cam tracks. Each rotatable member 140 is hingedly secured to the underside of either plate 126 or 125, by brackets 141. When members 140 are not supporting weight, they are maintained in the slightly rotated position by spring plungers 142, which are secured to the underside of plates 125 and 126. Slideable plungers (not shown) of spring plungers 142 are in contact with the underside of members 140. As weight is applied to members 140, they rotate to a flattened position. FIG. 7F illustrates a cam guide utilized when plates 125 and 126 are spaced apart, rotatable member 140, bracket 141, and spring plunger 142 being provided.

Referring to FIG. 4, drive means, generally 160 is secured to carriage 46 on mounting 161. Drive means 160 includes motor 162 and right angle gear unit 163. Shaft 164 of motor 162 is attached to shaft 165 of gear unit 163 by means of coupling 166, and shaft 167 of gear unit 163 is secured to lead screw 123 by coupling 168. Pillow block 169 is provided on the upperside of cross support 69 and provides rotatable support for lead screw 123.

Figure 3:
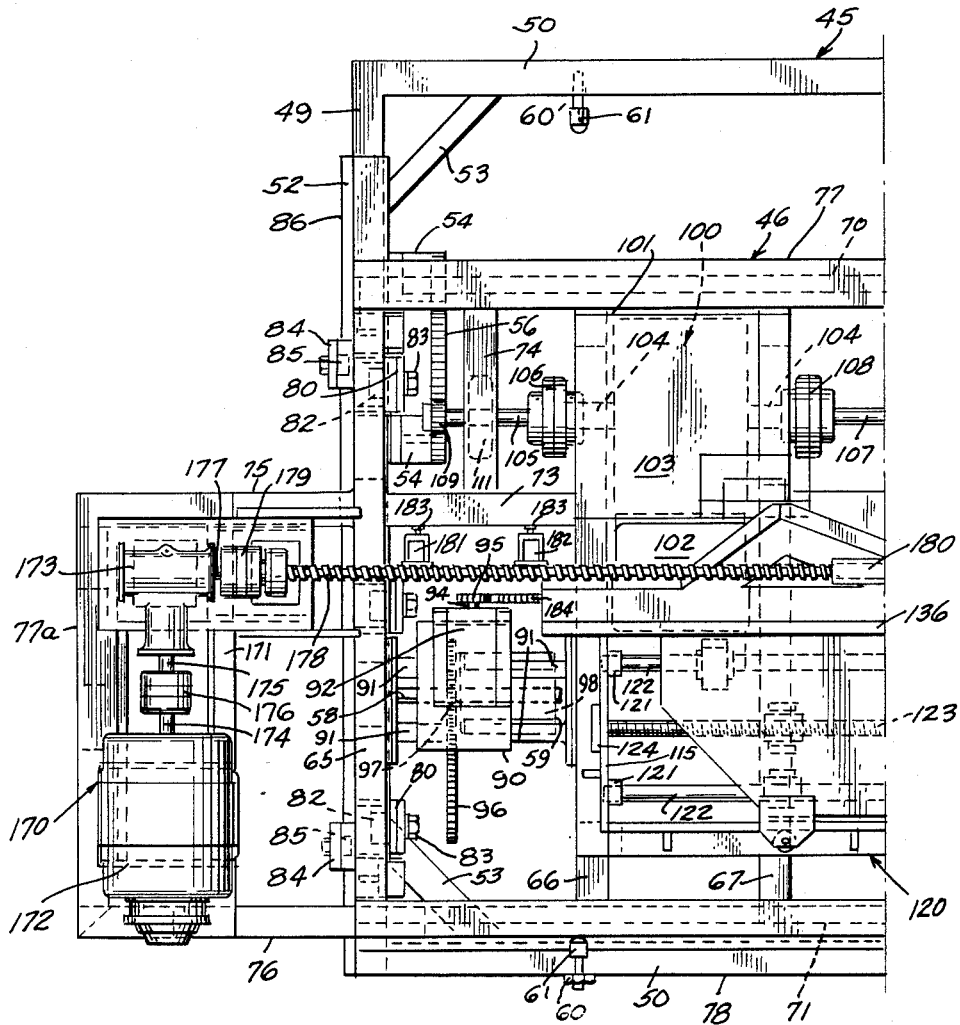
FIG. 3 is a top plan view of one half of the ham cutting means control apparatus.
Figure 16:
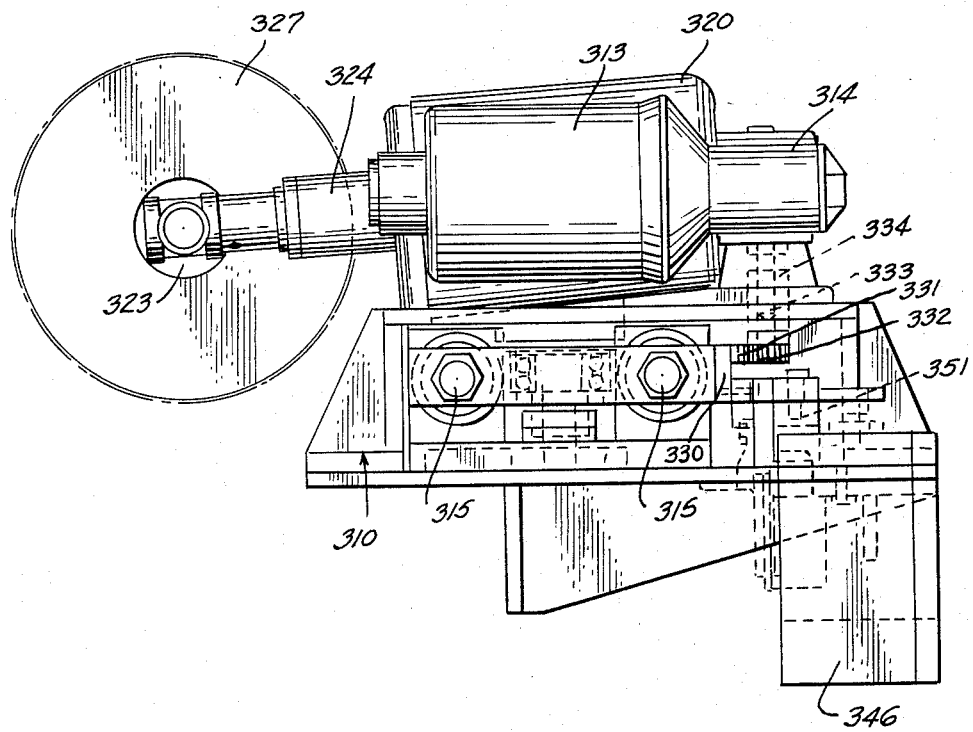
FIG. 16 is a side elevation view of the foot cutting means.

Referring to FIG. 3, longitudinal drive means generally 170 is secured to carriage 46 on support plate 171. Drive means 170 includes motor 172 and angle gear drive unit 173. Shaft 174 of motor 172 is attached to shaft 175 of gear unit 173 by coupling 176. Shaft 177 of unit 173 is secured to ball screw 178 by coupling 179. Ball screw 178 threadably engages ball nut 180, which is secured to moving carriage 47.

Attached to cam plate 126 by a bracket (not shown) are limit switches 181 and 182, having roller actuators 183. Also attached to cam plate 126 is gear rack 184 which engages gear 95 of rotary switch 92. Referring to FIG. 4, on the underside of plate 125 is switch bracket 185 to which is secured arm 186, carrying limit switch 187. Also, limit switch 188 is secured to bracket 185. Secured to frame 46 on support 190 is limit switch 189. Limit switches 187, 188 and 189 are each provided with roller actuators 191.

Frame 47 generally comprises longitudinal support 200, transverse supports 201 and 202, and longitudinal support 203 on the underside of supports 201 and 202. On the underside of transverse supports 201 and 202 are supports 204 and 205 which are fixedly secured to guide rods 206. Supports 204 also rotatably support rollers 207, 208 and 209.

Referring to FIGS. 5 and 6, moving carriage 47 is adapted to move on frame 46 by rollers 207 riding on tracks 77 and 78 of frame 46. Rollers 208 and 209 provide smooth rolling support for frame 47 as it moves on frame 46.

Limit switch tripper 210 is fastened to support 201 of frame 48 and is adapted to actuate limit switches 181 and 182. Limit switch tripper 211 on support 202 is adapted to actuate limit switch 187 and limit switch tripper 212 is adapted to actuate limit switch 188.

Fourth frame or moving carriage 48 is reciprocally mounted within frame 47. Frame 48 includes longitudinal supports 215 and 216 and transverse supports 217 and 218. Mounted on the underside of frame 48 are bearing brackets 219, which provide support for bearings 220. Bearings 220 are slideably positioned around guide rods 206. Mounted to the underside of frame 48 is cam follower support plate 222, to which are secured cam followers 223 and 224 by nuts 225. Cam follower 223 rides in cam tracks 127, 128, 129, 130 and 131 on cam plates 125 and 126.

Mounted on the upperside of frame 48 is ham saw rotating mechanism 230, shown in FIGS. 11 and 12. Ham saw rotating mechanism 230 includes drive means, generally, 231, and rotator drum 232. Drive means 231 includes motor 233, gear unit 234, gear unit 235 and cam switch 236. Shaft 237 of motor 233 is attached to shaft 238 of gear unit 234 by coupling 239. Shaft 240 of gear unit 234 is attached to shaft 241 of gear unit 235 by coupling 242, and is adapted to drive shaft 243 by coupling 244. Shaft 245 of gear unit 235 is coupled to shaft 246 of rotary cam switch 236 by coupling 247. Gear unit 235 and switch unit 236 are fastened to plate 248 which is on the upperside of frame 48. Likewise, motor 233 and gear unit 234 are secured to brackets (not shown) on the upperside of frame 48. Drive shaft 243 is coupled to worm gear shaft 249 by coupling 250. Rotator drum 232 is secured to mounting plate 251 which is on frame 48. Radial track supports 252, 253, and 254, are also secured to plate 251, and provide support for radial track 255.

Shown in FIGS. 13 and 14 is a detail view of the rotator drum 232 which includes casing 260. Worm gear shaft 249 is rotatably mounted in casing 260 by bearings 261 and 262. Worm gear 263 is provided on shaft 249 and meshes with gear 264, which is press fit around journal bearing 266. Bearing 266 is rotatably positioned around pivot member 267, which is maintained in place on plate 251 by means of pin 268. Mounted around pivot member 267 and in casing 260 is thrust bearing 269, allowing gear 255 to rotate in casing 260. Pivot member 267 is press fit in casing 260. Gear 264 is attached to plate 270 by fasteners, as bolts 271 and 272, and spacers 273 separate plate 270 from gear 264. Plate 270 is rotatable around pivot 267. Casing rim 274 is secured to casing 260 by bolts 275 and is provided with V-shaped ball-bearings track 276. Plate 270 is fastened to drive plate 277 by bolts or pins (not shown) and is provided with ball bearing guides 278. Guides 278 and tracks 277 together provide a confined path for ball bearings 279, and allow plate 270 to be rotatable relative to plate 277. Drive plate 277 is press fit into adapter 280, which in turn is press fit around band saw mounting plate 281. Adapter 280 is press fit around journal bearing 282, which is rotatable around pivot member 267. So, as worm gear 263 rotates gear 264, drive plate 277 is turned, ultimately causing the rotation of band saw mounting plate 281.

Mounted on plate 281 is ham cutting means or band saw 33. Referring to FIG. 1, band saw 33 is provided with a saw blade or knife 285, which is mounted around pulleys 286 and 287. Blade 285 is driven by a motor or other drive means 288, which is attached to shaft 289 of pulley 287. The top or table 290 of band saw 33 provides mounting for the foot cut-off mechanism, generally 295.

Referring to FIG. 12, band saw plate 281 is supported by braces 296, 297, and 298 at the pivot member 267. Also secured to the underside of plate 281 is guide 299 which is provided with ball bearings 300 that ride on track 255. Also mounted on plate 281 is ball bearing mounting assembly 301 which is provided with ball bearings 302 which ride on the upperside of track 255.

Referring to FIGS. 1 and 11, saw blade 285 is positioned approximately over the outside radius of pivot member 267.

As previously mentioned, closely associated with the ham removal is the removal of the hind foot 43 from the ham portion 35. The present apparatus enables the foot cut 42 to be performed at about the same time that the long ham cuts 37 and 39 are being made. The foot cut-off mechanism 295 will be described in detail.

*Foot Cut-Off Mechanism*

The foot cut-off mechanism is illustrated in FIGS. 1, 15, 16 and 17. As illustrated in FIG. 1, the cut-off mechanism 295 is mounted on table 290 of ham saw 33 so that foot cuts 42 are performed simultaneously with ham cuts 37 and 39.

Foot cut-off assembly 295 includes base 310 which is mounted on table 290. Base 310 is provided with bearing supports 311, which carry bearings 312. Positioning motor 313 is mounted on base 130, reducer 314 being securely mounted to motor 313.

Slidably mounted within bearings 312 are guide rods 315, which are held together at one end by tie bar 316 and bolts 317. The other end of guide rods 315 are held together by saw motor mounting, generally 318, and nuts 319.

On the upperside of mounting 318 is saw motor 320, shaft 321 of motor 320 being attached to shaft 322 of reducer 323 by coupling 324. Shaft 325 of gear reducer 323 is attached to shaft 326. Saw blade 327 is secured to shaft 326 by retainer 328 and bolt 329.

Secured to both motor mounting 318 and tie bar 316 is bar 330. Gear rack 331 is fastened to bar 330 and meshes with gear 332. Gear 332 is secured to shaft 333 of angle gear drive unit 314 by coupling 334. Since guide rods 315 are slidably positioned in bearings 312, as motor 313 rotates gear 332, which moves gear rack 331, causes movement of bar 330. This ultimately moves mounting 318 and saw blades 327. Also mounted on bar 330 is limit switch tripper assembly 335, which is adjustably secured to plate 330 by bolts 336. Bracket 337 is secured to base 310 and provides support for limit switches 338 and 339. Roller actuators 340 of switches 338 and 339 are adapted to contact tripper 335.

Mounted on the underside of base 310 is rotary switch mounting plate 345, which securely carries rotary switch 346 by bolts 347 and nuts 348. Gear 459 is attached to shaft 350 of switch 346. Bracket 351 is secured to base 310. Gear rack mounting 352 is slidably fastened to bracket 351 by bolts 353. Within mounting 352 is recess 354, and extending into recess area 354 is limit pin 355, which is secured to bar 330. Gear rack 360 is fastened to gear rack support 352, and meshes with gear 349 of rotary switch 346.

Figure 17:
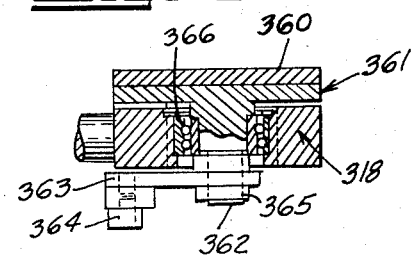
FIG. 17 is a sectional view of the foot cutting means rotating mechanism, taken along line 17—17 of FIG. 15.

Referring to FIG. 17, motor 329 is mounted on plate 360, which in turn is secured to rotating means 361. Rotating means 361 includes shaft 362 which has secured thereto arm 363. Arm 363 supports cam follower 364 and is secured to shaft 362 by lock nut 365. Shaft 362 is rotatably mounted within motor mounting 318 by bearing 366, carriage 318 being fixed to guide rods 315.

At one end of base 310 is cam plate 370, which is provided with straight cam track 371 and curved cam track 372, which together provide guide means for cam follower 364. By this mechanism, motor 320 and saw 326 are adapted to move out of position on the short cuts 34 and 40.

Now that there has been a detailed description of the apparatus of the ham cut-off mechanism and the foot cut-off mechanism, there will be an explanation of the operation of the devices, including a showing of their simultaneous operation.

*Operation*

In describing the operation of the ham cut-off and foot cut-off mechanism, various control set-up mechanisms may be used, although the light beam control set-up apparatus described in our co-pending application Serial No. 77,121 is preferred. Also, since the present description relates to an automated system, a preferred transfer mechanism is described in our co-pending application Seral No. 110,076. If desired, the apparatus may be used without the control and transfer mechanisms.

Referring to FIGS. 1 and 2, at the control set-up station, generally 375, an operator positions light beams emitted from foot lamp 376 and from ham lamp (not shown) at the precise position desired for foot cuts 42 and ham cuts 34, 37, 39 and 40. The foot lamp 376 moves transverse to the flow of the carcass and this movement adjusts a light beam on the carcass 30 for the particular length of carcass 30 being processed. The ham lamp (not shown) is adapted to move both longitudinally and transverse to the flow of the carcass 30. This longitudinal and transverse movement allows proper adjustment of the ham light beams on carcass 30 according to the particular size of animal being processed.

Movement of foot lamp 376 causes the closing of one of 20 normally open contacts in rotary switch 377. Each of the 20 contacts in switch 377 is electrically connected with one of 20 normally open contacts in rotary switch 346 which is on foot cut-off mechanism 295.

The ham lamp utilizes two rotary switches (not shown) each containing 27 normally open contacts. Each of the 27 contacts in the rotary switch that is positioned by transverse movement is electrically connected in series to one of 27 contacts in rotary switch 98, which is on frame 45. The 27 contacts of the rotary switch that is positioned by longitudinal movement of the ham lamp, is connected in series to rotary switch 92, which is on frame 46.

After all light lines have been set-up on the hog carcass 30, the carcass halves are transferred to the ham and foot cut-off station, generally 380. During this transfer operation, frame 46 and cam plates 125 and 126 are being positioned so that band saw 33 and foot cut-off mechanism 295 will be in proper cutting alignment with the carcass 30.

As carcass 30 is being lifted from the control set-up station 375, motor 102, which is on frame 45, starts and rotates gears 109 and 110. Since these gears mesh with gear racks 56 and 57 on frame 45, frame 46 rolls on rails 52 of frame 45 by means of rollers 85. As frame 46 is moving, the shaft (not shown) of rotary switch 98 is rotating since gear 97 engages gear rack 96 on moving frame 46. When the contact in switch 98, that is connected to the closed contact in the control set-up is closed, a relay (not shown) is energized and breaks the circuit which operates motor 102. Simultaneously, another relay (not shown) is energized and maintains the circuit of motor 102 in a de-energized condition. Since the second relay maintains motor 102 in a de-energized condition, the rotary switch in the control set-up station may be moved without affecting the set-up at the ham cut-off station.

When frame 46 is being moved relative to frame 45, cam plates 125 and 126 are being moved away from or towards the other. This is caused by the rotation of screw 123, upon the energizing of motor 162. The plates 125 and 126 are moved in opposite directions since nuts 132 and 133 on the underside of plates 125 and 126 have opposite threads, causing opposite movement when screw 123 rotates. Gear rack 184, which is secured to plate 126, engages gear 95 and causes the rotation of shaft 94 of rotary switch 92. This rotation closes one of the 27 open contacts that is connected to the closed contact of the longitudinal rotary switch in the control set-up station. At this time, a relay (not shown) is energized and stops motor 162. A second energized relay (not shown) maintains motor 162 in a stopped condition, and the rotary switch in the control set-up may be moved without affecting the set-up at the ham cut-off station.

Carcass halves 30 are set down in the ham and foot cut-off station after motors 102 and 162 have been de-energized and frame 46 and cam plates 125 and 126 are in proper cutting position for the particular carcass being processed.

After the carcass halves 30 have been set down, motor 172 on frame 45 starts and rotates ball screw 178, through angle gear drive unit 173. Since ball nut 180 engages ball screw 178 and is also secured to frame 47, rotation ultimately pulls frame 47 along rails 70 and 71 of frame 46, by rollers 207, 208 and 209.

As frame 47 is pulled by motor 172, frame 48, being reciprocally mounted within frame 47 is also pulled in the same direction. Frame 48 slides on guide rods 206, which are secured to frame 47, by means of bearings 220 on frame 48. Reciprocating carriage 48 is also moved transversely, since cam follower 224 on the underside of frame 48 is guided in cam track 127 of cam plate 125. As cam follower 224 moves in cam track 127, band saw blade 285 is performing the first short cut 34, which generally is parallel to cam track 127. As cam follower 224 moves in track 127, rotatable member 140 is forced into a flattened position, allowing the passage of follower 224. Motor 172 operates until limit switch tripper 212 actuates limit switch 188 by contacting roller 191, and a relay (not shown) breaks the circuit of motor 172.

Limit switch 188 also actuates a second relay (not shown) which starts motor 233. As motor 233 operates, shaft 240 of gear unit 234 is rotated, causing the rotation of shaft 246 of cam switch 236 and the rotation of worm gear shaft 249 of rotator unit 232. Worm gear 263 on gear shaft 249 meshes with and causes the rotation of gear 264. Gear 264 rotates plates 270, 277 and band saw mounting plate 281, which carries band saw 33. Saw blade 285 is turned in approximately a 2 inch radius, performing the arcuate cut 41, connecting ham cuts 34 and 37. Plate 281 is also rotatably supported by ball bearings 302 on plate 281 riding on track 255 which is on the upper side of carriage 48. Motor 233 continues operating and rotating band saw 33, until band saw blade 285 is in proper position for the second cut 37 on the ham portion, at which time a cam switch (not shown) in cam switch unit 236 is closed. The closing of this switch actuates a relay (not shown) which causes motor 233 to stop.

The foot cut-off saw 327 is not in position for the first foot cut 42 until after the first ham cut 34 has been made. When limit switch 188 is actuated a third relay (not shown) is energized and starts motor 313 of foot cut-off unit 295, causing the positioning of saw blade 327 for the foot cutting operation. As motor 313 operates, gear 332 is rotated through gear unit 314. Gear 332 meshes with gear rack 331 on bar 330, and thereby causes the movement of guide rods 315 and ultimately saw blade 327. As motor 313 moves bar 330 and guide rods 315, motor 320 and saw blade 327 are rotated approximately 90°, until the blade 327 is substantially parallel with band saw blade 285, since cam follower 364 rides in curved cam track 372. After the turn is made, follower 364 rides in straight cam track 371. Gear rack support 352 is maintained in a stationary position as motor 320 and blade 327 are rotated 90°, and remains stationary for a short time during the straight movement of motor 320 and blade 327. Support 352 is not slideably moved until limit pin 355 reaches the end of recess 354 and begins pushing the support 352 and causing the movement of gear rack 360. Since rack 360 meshes with gear 349, movement of rack 360 causes rotation of shaft 350 of limit switch 346. When the normally open contact in limit switch 346, that is connected to the closed contact in the control set-up is closed, a relay (not shown) is energized and breaks the circuit for motor 313. Saw blade 327 is then in proper position for the first foot cut 42. A second relay (not shown) is energized when saw blade 327 is in position, and this starts motor 172.

As motor 172 operates, ball screw 178 is turned and ball nut 180, being connected to frame 47 pulls ham saw blade 285 and foot cut-off saw 327 through the carcass 30 for the second ham cut 37 and the foot cut 42.

The ham cut 37 is substantially parallel to foot cut 42. Cam follower 224, on the underside of frame 48 moves in cam track 128 causing frame 48 to slide on guide rods 206 of frame 47. As follower 224 moves in track 128, rotatable member 140 is forced into a substantially flat position, allowing follower 224 to proceed and properly guide blades 285 and 327 along track 128 for cuts 37 and 42. Motor 172 continues to operate until limit switch tripper 211 on frame 47 contacts roller actuator 191 of limit switch 187. This actuates a relay (not shown) which de-energizes motor 172. Limit switch 187 also actuates a second relay (not shown) which starts motor 233 of rotating mechanism 231. The operation of motor 233 rotates shaft 246 of cam switch 236 and worm gear 249 of rotating unit 232. The direction of rotation is in a clock-wise position so that the saw blade 285 is in proper cutting position for the third cut 39. Rotation continues until a third cam switch in cam switch unit 236 is closed. Closing of this switch not only stops motor 233, but it also starts drive motor 172 for pulling frame 47 for the third ham cut 39 and second foot cut 42. As cam follower 224 crosses the space between the separated cam plates 125 and 126, cam follower 223, on the underside of frame 48, contacts the edge of rotatable member 140, as shown, in FIG. 7F, and guides frame 48 across this space until follower 224 enters cam track 129.

Similar to the second ham cut 37 and the first foot cut 42, the third ham cut 39 is performed substantially parallel to foot cut 42 on the second half of the carcass 30. Also, the cam follower 223 is guided along cam track 129 guiding blades 285 and 327 for the proper cut of both the ham portion 35 and foot portion 43. Rotatable member 140 is forced into a flattened position allowing the passage of cam follower 223. Motor 172 continues to operate until follower 223 reaches the apex of the inverted-V of cam tracks 129 and 130, at which time roller actuator 183 of limit switch 182 is contacted by tripper 210 on frame 47. This actuates a relay (not shown) which de-energizes motor 172 and stops the forward movement of frame 47.

Actuating limit switch 182 also energizes a relay (not shown) which starts rotating motor 233 causing band saw 233 to be turned in a counter-clockwise direction causing the arcuate cut 41 between ham cuts 39 and 40. The rotating operation mechanism is similar to the first and second rotations of saw 33.

Limit switch 182 also energizes a relay (not shown) which actuates drive motor 313 of foot mechanism 295, causing saw blade 327 to be retracted out of position when the fourth cut 40 is made on the carcass 30. Motor 313 is stopped when tripper 335 contacts roller 340 of limit switch 339, just before the follower 364 enters curved cam track 372.

Motor 233 continues operating until a third cam switch (not shown) in cam switch unit 236 actuates a relay (not shown), stopping motor 233. The cam switch also energizes another relay (not shown) which starts motor 172 and pulls frame 47 for the fourth cut 40. Cam follower 223 is guided in cam track 130, and rotatable member 140 is forced into a flattened position. Motor 172 continues to operate until tripper 210 on frame 47 contacts roller 183, actuating limit switch 181, at which time a relay (not shown) stops, reverses and starts the reverse circuit, of motor 172, causing frame 47 to be returned to the starting position. When frame 47 actuates limit switch 189, a relay (not shown) is energized, stopping motor 192, and positioning frame 47 at the zero or starting position for the next carcass to be processed.

Actuating limit switch 181 also energizes a second relay (not shown) which starts motor 313 of foot cut-off mechanism 295, rotating foot saw 327, 90° to the starting position, since cam follower 364 moves in curved track 372. When the turn is completed, roller 340 of limit switch 338 is contacted, actuating limit switch 338 and ultimately de-activating motor 313. The foot cut-off mechanism is now in the starting position and is ready for a cycle on another animal carcass 30.

Limit switch 181 further reverses and energizes a third relay (not shown) which starts turn-table motor 233, driving the band saw 33 in a clockwise direction so that the blade 285 is in proper cutting position for the first cut 34 on the next carcass to be processed. Motor 233 operates until a fourth cam switch in cam switch unit 236 is actuated, stopping motor 233 at the appropriate cutting position.

Also, limit switch 181 energizes a fourth relay (not shown) which reverses and starts motor 102, returning frame 46 to the starting position. Motor 102 continues to operate until a limit or contact switch (not shown) is contacted and indicates that the frame 46 is back in the starting position.

Further, limit switch 181 energizes a fifth relay (not shown) which starts cam plate motor 162, returning cam plates 125 and 126 to the starting position. A switch (not shown) is contacted when cam plates 125 and 126 are in the starting position, and motor 162 is stopped.

Both the ham cut-off mechanism and foot cut-off mechanism are in position to start another complete cycle of operation on the next hog carcass. Frames 46 and 47 and cam plates are in the starting position.

Further, rotating mechanism 232 has caused band saw 33 to be rotated into the proper position for the first cut 34.

While in the foregoing specification, we have described the apparatus and method of procedure in considerable detail, it is to be understood that such details of structure and procedure may be varied widely by those having ordinary skill in the art, without departing from the spirit and scope of our invention.

We claim:

1. In severing apparatus, a base frame, a first carriage movable upon said base frame in one direction, a second carriage movably mounted upon said first carriage for movement in a different direction, a third carriage movably mounted upon said second carriage for movement in the direction of movement of said first carriage, a rotatable support on said third carriage, cutting means carried by said support, cam tracks on said first carriage arranged at angles to each other, a cam follower secured to said third carriage and engaging said cam tracks, and means for rotating said rotatable support carrying said cutting means.

2. The structure of claim 1 in which a second cutting device is carried by said third carriage in spaced relation to said first-mentioned cutting means.

3. In apparatus for severing a meat animal carcass, means for supporting said carcass, a fixed frame, a second frame carried by said fixed frame for movement longitudinally of said carcass, a third frame mounted for movement transversely of the carcass, a fourth frame carried by said third frame and mounted for movement longitudinally of the carcass, cutting means carried by said fourth frame, and means carried by said fourth frame for partially rotating said cutting means.

4. The structure of claim 3 in which a second cutting means is carried by the fourth frame and is rotatably mounted, and means for bringing both of the cutting means simultaneously into engagement at one point with the carcass.

5. In carcass break-up apparatus, a support member for supporting two carcass halves skin-side-down and in side-by-side relation, cutting means supported for movement toward carcass halves, means for moving said cutting means through said carcass halves in an angular M path, and means for moving the cutting means in an arc at each apex of the M path.

6. The structure of claim 5 in which cam and cam track means are provided for guiding said cutting means in said angular path, and pivotally-mounted means are provided for rotating said cutting means at the apex of the M path.

7. In apparatus for severing hog carcasses, means for supporting a carcass half having ham and foot portions, a movably-mounted cutter support, ham-cutting means carried by said support, foot-cutting means also carried by said support in spaced relation from said ham-cutting means, means for moving said ham-cutting means in different angular positions relative to said foot-cutting means, and means for moving said ham-cutting means and foot-cutting means in unison for severing ham and leg portions.

8. The structure of claim 7 in which said ham-cutting means and foot-cutting means are moved in unison for severing said ham and leg portions along substantially parallel lines.

9. In article-severing apparatus, a support for the article, a frame, a carriage movably mounted on said frame, cutting means carried by said carriage, a cam follower secured to said carriage, cam tracks carried by said frame for guiding said cam follower, and pivotally-mounted means independent of said cam tracks for rotating said carriage and cutting means carried thereby.

10. In hog carcass break-up apparatus, means for supporting two carcass halves in side-by-side relation, a frame, cutting means movably mounted on said frame and comprising a foot-cutting means and a ham-cutting means spaced from said foot-cutting means and movable independently thereof, means for moving said ham-cutting means in different paths relative to the path of said foot-cutting means, and means for moving both of said cutting means through said carcass halves to divide both carcass halves.

References Cited in the file of this patent
UNITED STATES PATENTS

| | | |
|---|---|---|
| 1,161,039 | Foight et al. | Nov. 23, 1915 |
| 1,386,824 | White | Aug. 9, 1921 |
| 1,817,678 | Dunseth | Aug. 4, 1931 |
| 1,959,022 | Donahoe | May 15, 1934 |
| 2,172,313 | Young | Sept. 5, 1939 |
| 2,640,225 | Force et al. | June 2, 1953 |
| 2,891,605 | Love | June 23, 1959 |
| 3,010,352 | Dunlap | Nov. 28, 1961 |